(12) United States Patent
Chung et al.

(10) Patent No.: US 9,921,699 B2
(45) Date of Patent: Mar. 20, 2018

(54) CONDUCTIVE LINE STRUCTURE AND SENSING DEVICE USING THE SAME

(71) Applicant: Industrial Technology Research Institute, Hsinchu (TW)

(72) Inventors: Sheng-Feng Chung, Hsinchu (TW);
Chun-Ting Liu, Hsinchu County (TW);
Su-Tsai Lu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/937,898

(22) Filed: Nov. 11, 2015

(65) Prior Publication Data

US 2016/0139709 A1    May 19, 2016

Related U.S. Application Data

(60) Provisional application No. 62/078,979, filed on Nov. 13, 2014.

(30) Foreign Application Priority Data

Jun. 30, 2015 (TW) .............................. 104121016 A

(51) Int. Cl.
*G06F 3/045* (2006.01)
*G06F 3/044* (2006.01)
(52) U.S. Cl.
CPC .... *G06F 3/044* (2013.01); *G06F 2203/04112* (2013.01)
(58) Field of Classification Search
CPC ........................ G06F 3/044; G06F 2203/04112

USPC ......................................................... 345/174
See application file for complete search history.

(56) References Cited

U.S. PATENT DOCUMENTS

| 7,825,905 | B2 | 11/2010 | Philipp |
| 8,508,680 | B2 | 8/2013 | Geaghan et al. |
| 8,599,150 | B2 | 12/2013 | Philipp |
| 2006/0121738 | A1* | 6/2006 | Egitto .................... H05K 1/056 |
| | | | 438/694 |
| 2007/0001034 | A1 | 1/2007 | Sugahara |

(Continued)

FOREIGN PATENT DOCUMENTS

| CN | 1490713 | 4/2004 |
| CN | 101477430 | 11/2012 |

(Continued)

OTHER PUBLICATIONS

"Office Action of Taiwan Counterpart Application", dated Sep. 10, 2016, p. 1-p. 7.

(Continued)

*Primary Examiner* — Ngan T Pham Lu
(74) *Attorney, Agent, or Firm* — JCIPRNET

(57) ABSTRACT

In one embodiment, a conductive line structure includes a substrate and a plurality of conductive lines thereon. The substrate has a first area and a second area, and the two areas are separated by at least one borderline. The plurality of conductive lines are disposed at the first area and the second area of the substrate, respectively. The at least one borderline may be a straight line, and the conductive lines disposed at the second area are inclined relative to the at least one borderline. A sensing device using the conductive line structure is also provided.

26 Claims, 7 Drawing Sheets

(56) References Cited

U.S. PATENT DOCUMENTS

| | | | | |
|---|---|---|---|---|
| 2008/0012678 A1* | 1/2008 | Lee | ............... | H01F 17/0006 336/200 |
| 2012/0031647 A1* | 2/2012 | Hwang | ............... | C23F 1/02 174/250 |
| 2012/0313864 A1 | 12/2012 | Cheng et al. | | |
| 2014/0041999 A1 | 2/2014 | Yim et al. | | |
| 2014/0118298 A1* | 5/2014 | Han | ............... | G06F 3/044 345/174 |
| 2014/0226092 A1* | 8/2014 | Hwang | ............... | H01H 1/5805 349/12 |

FOREIGN PATENT DOCUMENTS

| | | |
|---|---|---|
| CN | 202771407 | 3/2013 |
| CN | 103105972 | 5/2013 |
| CN | 103425320 | 12/2013 |
| CN | 203376715 | 1/2014 |
| CN | 103793117 | 5/2014 |
| CN | 103827789 | 5/2014 |
| CN | 103827794 | 5/2014 |
| CN | 104133602 | 11/2014 |
| TW | 201432868 | 8/2014 |
| TW | M488683 | 10/2014 |

OTHER PUBLICATIONS

Lee et al., "Development of a gravure offset printing system for the printing electrodes of flat panel display," Thin Solid Films, Apr. 2010, pp. 3355-3359.

Choi et al., "A modified offset roll printing for thin film transistor applications," Microelectronic Engineering, Mar. 2012, pp. 93-97.

Kim et al., "Effect of ink cohesive force on gravure offset printing," Microelectronic Engineering, Oct. 2012, pp. 587-589.

Sankaran et al., "Effect of viscoelasticity on liquid transfer during gravure printing," Journal of Non-Newtonian Fluid Mechanics, May 2012, pp. 64-75.

Lee et al., "Design and fabrication of printed transparent electrode with silver mesh," Microelectronic Engineering, Oct. 2012, pp. 556-560.

"Office Action of China Counterpart Application," dated Dec. 4, 2017, p. 1-p. 9, in which the listed references were cited.

* cited by examiner

CONDUCTIVE LINE STRUCTURE AND SENSING DEVICE USING THE SAME

CROSS-REFERENCE TO RELATED APPLICATION

This application claims the priority benefits of U.S. provisional application Ser. No. 62/078,979, filed on Nov. 13, 2014 and Taiwan application serial no. 104121016, filed on Jun. 30, 2015. The entirety of each of the above-mentioned patent applications is hereby incorporated by reference herein.

TECHNICAL FIELD

The disclosure relates to a conductive line structure and a sensing device using the same.

BACKGROUND

With the rapid development of electronic technology, as well as wireless communications and the popularization of the Internet, various electronic products are becoming indispensable tools for life. General input and output (input/output, I/O) interfaces gradually use a touch-sensing device to replace such as a keyboard or a mouse. Therefore, the sensing device is commonly used to facilitate the implementation of control as a communication interface between the human and electronic means.

With the development of technology, the direction of the existing sensing device is toward large size and light. There may exist the problem of uniformity in the production of a sensing electrode layer of a large-size. Therefore, it may become an import issue for a large-size sensing device to improve its structure and manufacturing process.

SUMMARY

One embodiment of the disclosure relates to a conductive line structure. The conductive line structure may comprise a substrate and a plurality of conductive lines. The substrate has a first area, a second area, and at least one borderline separating the first area and the second area. The plurality of conductive lines on the substrate are disposed at the first area and the second area, wherein the at least one borderline is a straight line, and the plurality of conductive lines disposed at the second area are inclined relative to the at least one borderline.

Another embodiment of the disclosure relates to a sensing device. The sensing device may comprise a substrate and a plurality of conductive lines. The conductive lines are disposed on the substrate, wherein a portion of the plurality of conductive lines form an active area and another portion of the plurality of conductive lines form a frame wire area. The active area and the frame wire area are separated by at least one borderline. The at least one borderline is a straight line, and the plurality of conductive lines at the frame wire area are inclined relative to the at least one borderline.

DETAILED DESCRIPTION OF DISCLOSED EMBODIMENTS

Figure 1:
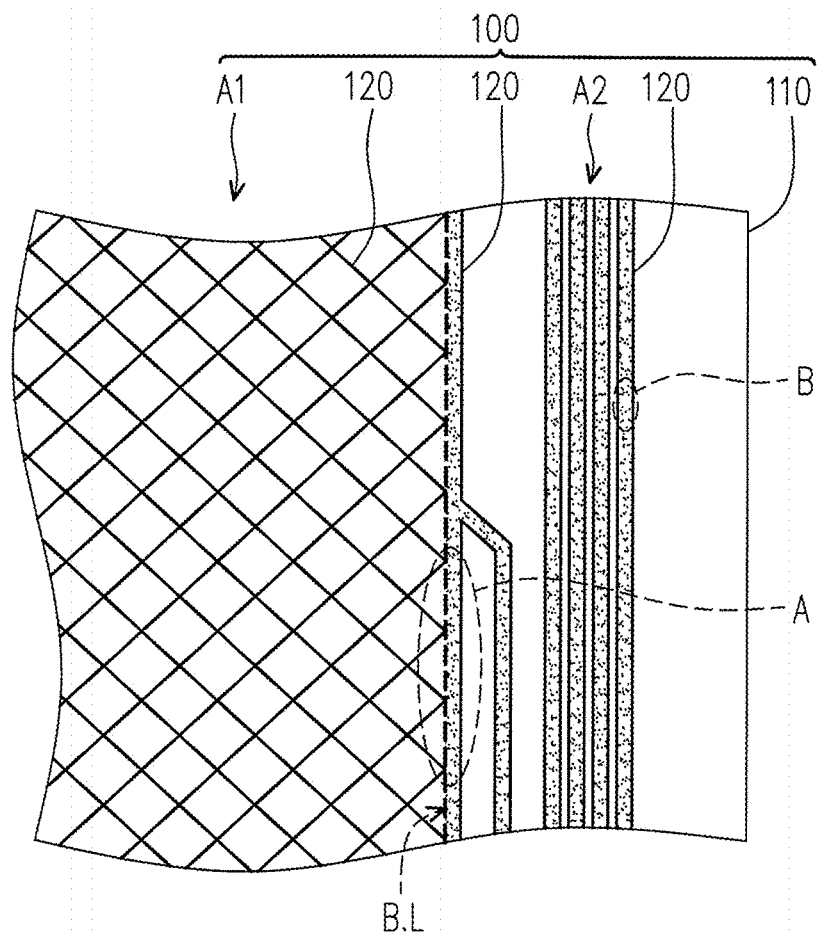
FIG. 1 is a schematic diagram illustrating a sensing device according to an embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
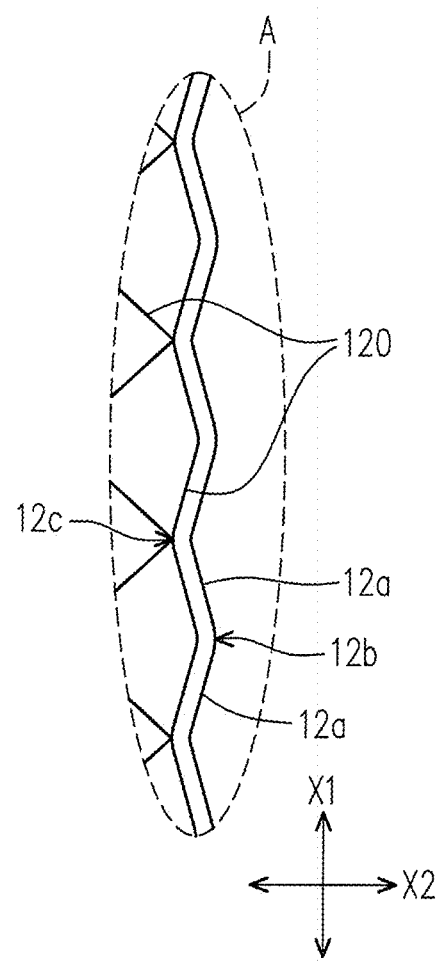
FIG. 2 and FIG. 3 are enlarged diagrams, further illustrating the part A and the part B of the sensing device in FIG. 1, respectively.
Figure 3:
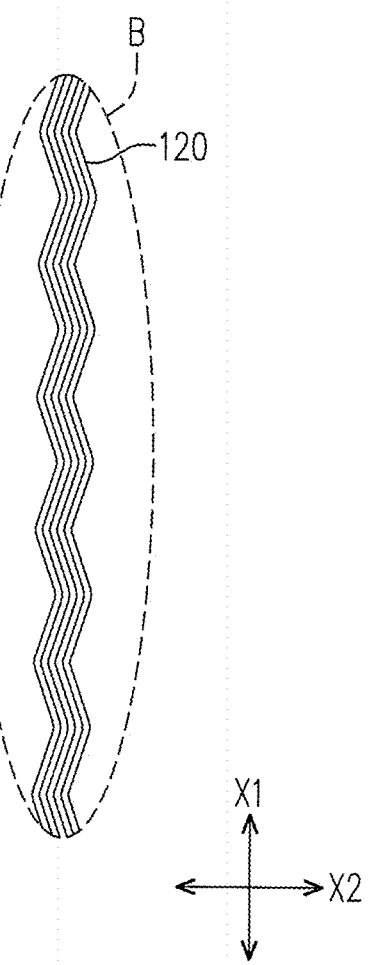

FIG. 1 is a schematic diagram illustrating a sensing device according to an embodiment of the disclosure. FIG. 2 and FIG. 3 are enlarged diagrams illustrating conductive lines at different areas of the sensing device in FIG. 1, respectively. Referring to FIG. 1 to FIG. 3, a sensing device 100 comprises a substrate 110 and a plurality of conductive lines 120 disposed thereon. The plurality of conductive lines 120 may be disposed on the substrate 110 by a printing method, for example, a gravure printing method.

As shown in FIG. 1, a portion of the plurality of conductive lines 120 disposed on the substrate 110 form an active area A1 of the substrate 110, which is deemed a sensing area of the sensing device 100. Another portion of the plurality of conductive lines 120 form a frame wire area A2. The frame wire area A2 is adjacent to the active area A1. The frame wire area A2 and the active area A1 may be separated by at least one virtual borderline B.L. The borderline B.L may be, but not limited to a straight line. In the FIG. 1, part A depicts the state that the conductive lines at frame wire area A2 directly connect to the conductive lines at the active area A1, while part B depicts the state that the conductive lines at frame wire area A2 do not directly connect to the conductive lines at the active area A1. Part A and part B will be further explained.

In the embodiment, one borderline B.L is shown in FIG. 1, but not limited thereto. According to exemplary embodiments of the present disclosure, there may be one or more borderlines B.L on the substrate 110 to separate the active area A1 and the frame wire area A2. This may depend on design requirements of the sensing device. For instance, a rectangular active area A1 may be surrounded by the frame wire area A2, therefore, there may be, but not limited to four borderlines B.L between the two areas. The number of the borderlines B.L may depend on the contour of the active area A1.

As shown in FIG. 1, the conductive lines at the frame wire area A2 may be shown as one or more parallel bands. FIG. 2 and FIG. 3 are enlarged diagrams, further illustrating the part A and the part B of the sensing device in FIG. 1, respectively. In FIG. 2, the band may be formed by one conductive line 120. In FIG. 3, the band may be formed by a plurality of conductive lines 120, and the conductive lines at the frame wire area A2 may be inclined relative to the borderline B.L.

Referring to FIG. 2, which is an enlarged diagram of part A in FIG. 1, each of the conductive lines 120 may be composed of a plurality of straight-line sections 12a and bendings 12b connected between the plurality of straight-line sections 12a, such that the conductive lines 120 at the frame wire area A2 are a plurality of bending lines extending along an axis X1, the bending lines include the straight-line sections 12a and the bendings 12b are arranged in an interlaced manner along the axis X1, wherein the straight-line sections 12a of adjacent conductive lines along an axis X2 are parallel to each other, and each of the straight-line sections 12a is inclined relative to the borderline B.L. In the embodiment, the axis X1 is orthogonal to the axis X2, and the borderline B.L is parallel to the axis X1. FIG. 3 is an enlarged diagram of part B in FIG. 1, which shows a similar contour. In addition, the conductive lines at active area A1 may be formed in a mesh structure, and the leftmost conductive line at the frame wire area A2 is electrically connected to the border area of the mesh structure. FIG. 2 also illustrates an electrical connection located at an intersection 12c of the mesh structure.

However, the embodiments of the disclosure do not limit the implementation scheme for the electrical connections between the conductive lines 120 at the active area A1 and the conductive lines 120 at the frame wire area A2.

Figure 4:
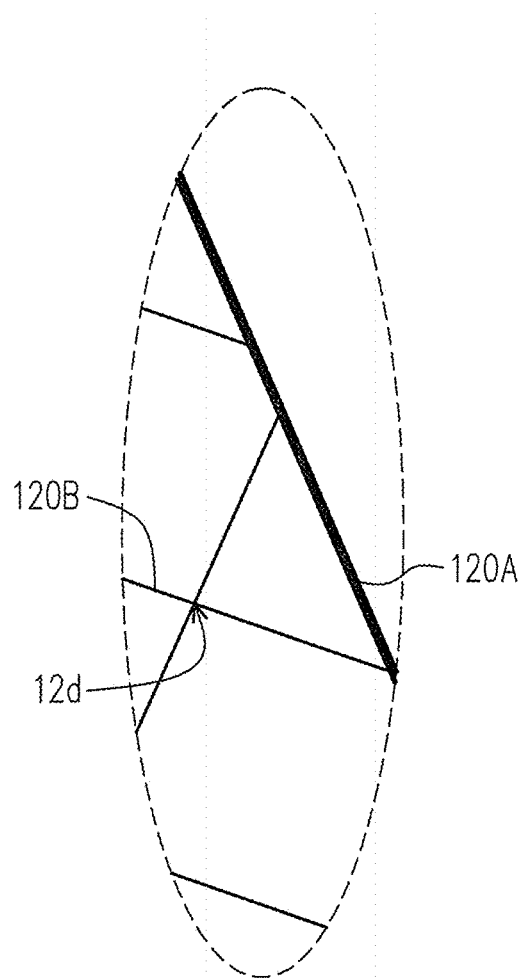
FIG. 4 and FIG. 5 are enlarged diagrams illustrating different electrical connections between the conductive lines at different areas, according to different embodiments of the disclosure, respectively.
Figure 5:
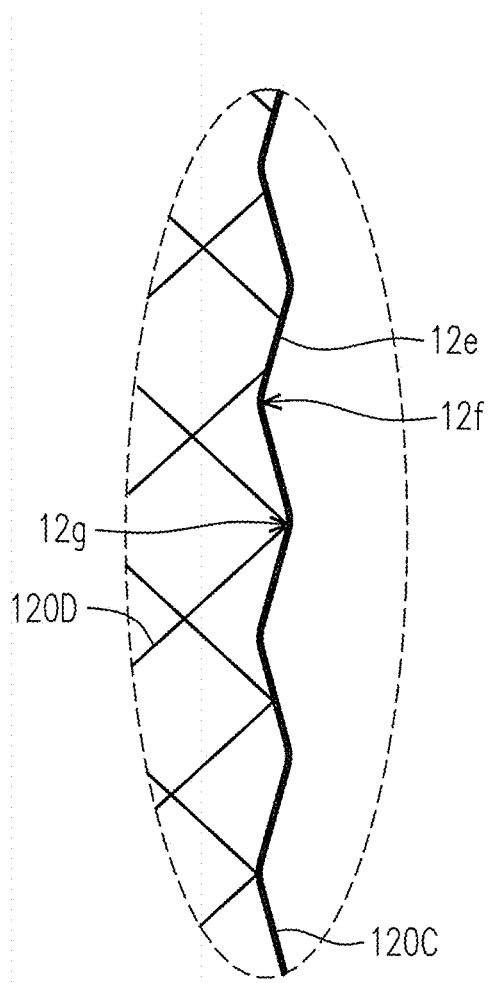

FIG. 4 and FIG. 5 are enlarged diagrams illustrating different electrical connections between the conductive lines at different areas, according to different embodiments of the disclosure, respectively. Referring to FIG. 4, a conductive line 120A, for example, of 20 μm in width, next to the active area A1 is electrically connected to at least one conductive line 120B of the mesh structure, and connection portions of the conductive lines 120A and 120B are out of intersection 12d of the mesh structure, wherein the conductive line 120A may be as the aforementioned straight-line section 12a of the conductive line 120 at the frame wire area A2.

Referring to FIG. 5, a conductive line 120C at the frame wire area A2 may have a plurality of straight-line sections 12e and bendings 12f, and may connect to an intersection 12g and/or out of intersection of the mesh structure at active area A1. And at least one conductive line 120D at the active area A1 may connect to the straight-line sections 12e and/or bendings 12f of the at least one conductive line 120C at the frame wire area A2.

As may be seen from FIG. 2 to FIG. 5, along the at least one borderline B.L, there are a variety of different electrical connections between the bending conductive lines at the frame wire area A2 and the conductive lines of the mesh structure at the active area A1.

Figure 6:
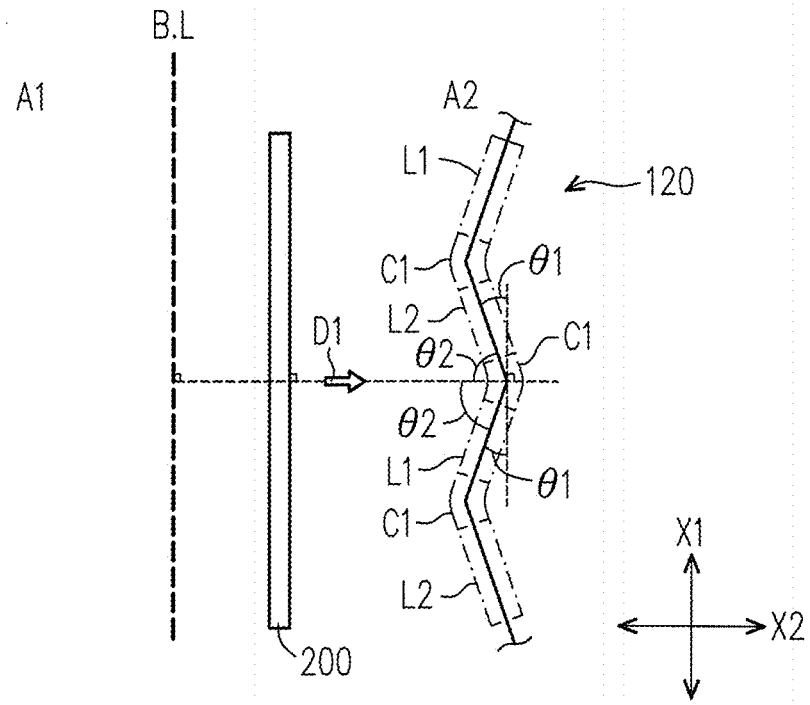
FIG. 6 is an enlarged diagram illustrating one of the conductive lines of the sensing devices shown in FIG. 2 to FIG. 5.

FIG. 6 is an enlarged diagram illustrating one of the conductive lines of the sensing devices shown in FIG. 2 to FIG. 5. Referring to the exemplar of FIG. 6, the conductive line 120 is divided into a plurality of straight-line sections such as L1, L2 and bendings C1 connected between the straight-line sections such as L1, L2. Bendings C1 may form a closed angle. The conductive lines 120 may be formed on the substrate 110 by such as a gravure printing method. A doctor blade extends along the axis X1 and moves to print the conductive material on the substrate 110 in a direction D1 along the axis X2, in which the straight-line sections L1, L2 may be inclined relative to the axis X1 and/or the axis X2.

There exists an angle θ1 between the straight-line section L1 or L2 of the conductive line 120 and the axis X1, which also means an angle θ2 is included between the straight-line L1 or L2 and the axis X2, wherein the angle θ1 of the disclosure may be, but not limited to range from 15° to 75° (that is, the angle θ2 may be ranged from 75° to 15°). The straight-line sections L1 or L2 may be inclined relative to the axis X1 and/or the axis X2, and accompanying the relationship with the aforementioned angle, the conductive line 120 may be symmetric with respective to the axis X2, as shown in FIG. 6.

In the embodiment of the disclosure, the straight-line section L1 or L2 is neither parallel nor orthogonal to the borderline B.L (axis X1), and a zig-zag conductive line 120 may be formed, such that a doctor blade 200 is used for printing the conductive material on the substrate 110 along the direction D1. This may reduce the residual conductive material on the substrate 110.

Figure 7:
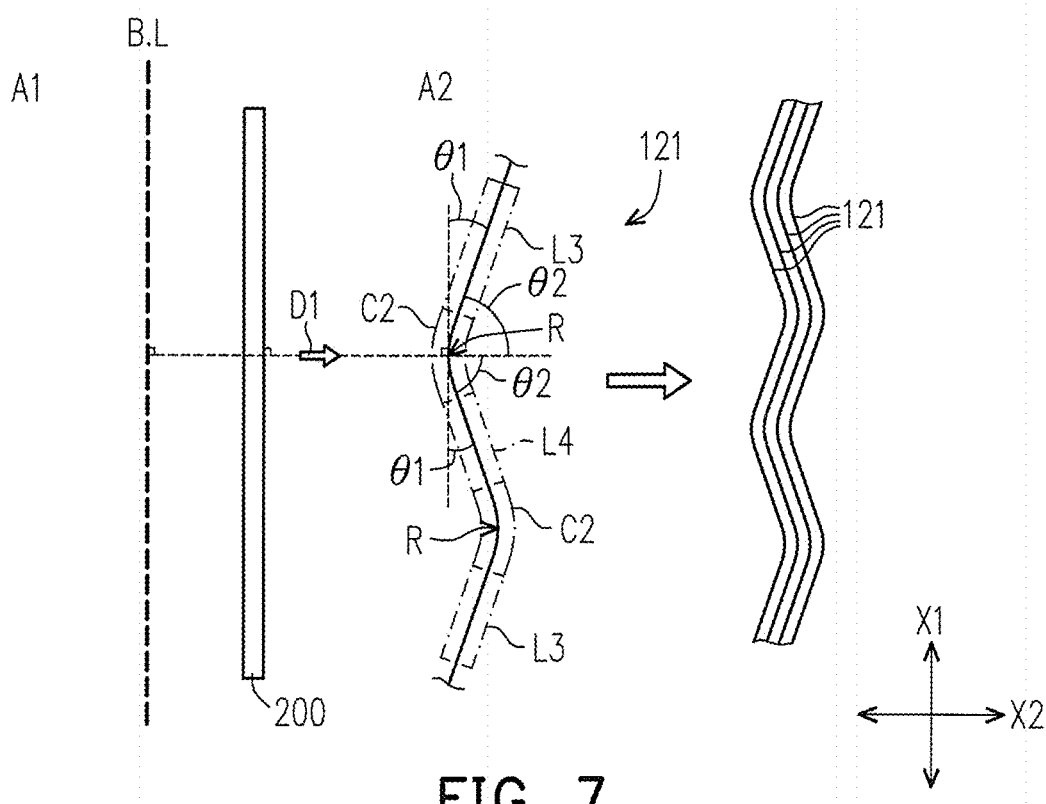
FIG. 7 to FIG. 10 are enlarged diagrams of the conductive lines according to different embodiments of the disclosure.

FIG. 7 is an enlarged diagram illustrating of the conductive lines according to another embodiment of the disclosure. Referring to FIG. 7, a conductive line 121 is in a shape of bending, the angle θ1 is included between a straight-line section L4 (or L3) and the axis X1, and the angle θ2 is included between a straight-line section L4 (or L3) and the axis X2, wherein a bending C2 connected between two straight-lines L3 and L4 may be a fillet R. The conductive line 121 in FIG. 7 may be formed in a streamline pattern.

Figure 8:
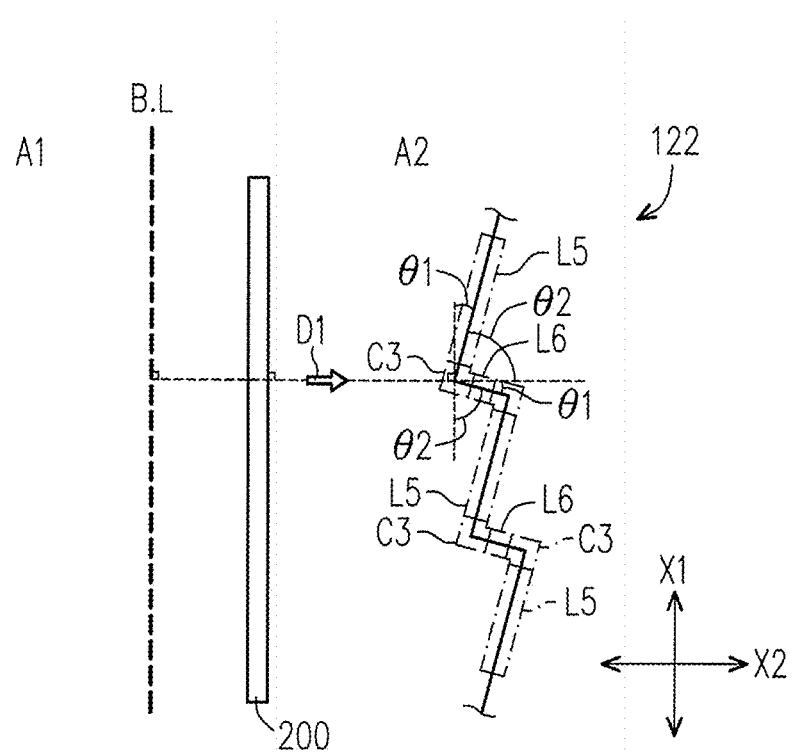

FIG. 8 is an enlarged diagram illustrating the conductive lines according to another embodiment of the disclosure. Referring to FIG. 8, straight-line sections L5, L6 of a conductive line 122 may have difference lengths and are arranged in an interlaced manner, which is different from the aforementioned that the lengths of the straight-line sections L1, L2 are equal to each other. Besides, bendings C3 connected between the straight-line sections L5, L6 may be similar to the bendings C1 or C2.

Figure 9:
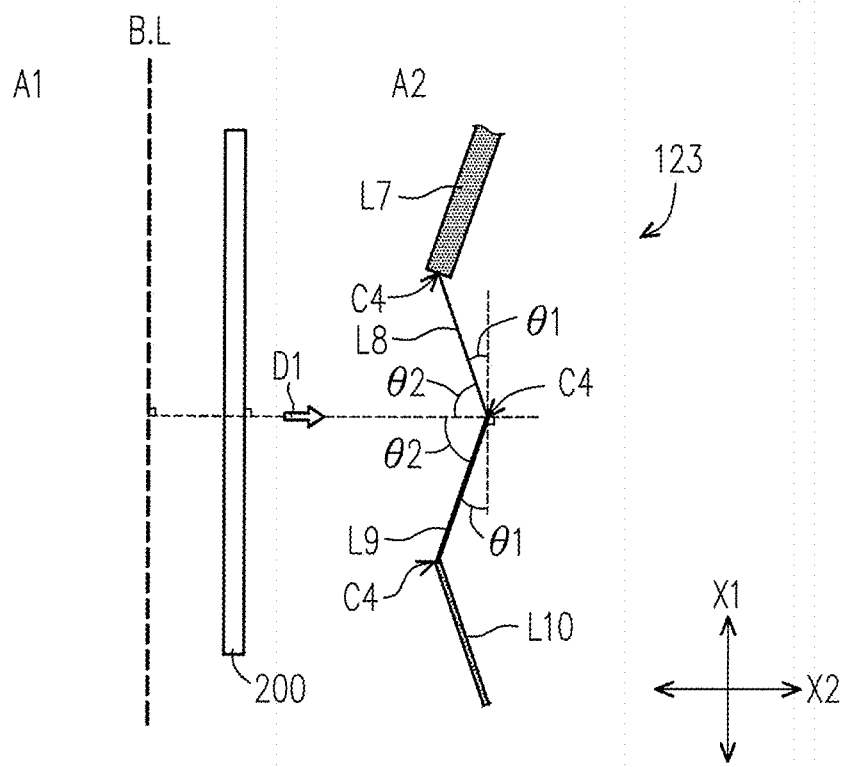

FIG. 9 is an enlarged diagram illustrating the conductive lines according to another embodiment of the disclosure. Referring to FIG. 9, a conductive line 123 may be composed of a plurality of straight-line sections L7 to L10 having different widths, and bendings C4 connected between the straight-line sections L7 to L10 may form at least one closed angle and/or at least one fillet. According to an embodiment of the disclosure, there exists a relation of W7>W10>W9>W8 for the widths of the straight-line sections L7 to L10, wherein W7 to W10 are the widths corresponding to the straight-line sections L7 to L10 respectively. For example, the W7 to W10 may be, but not limited to less than 50 μm.

Figure 10:
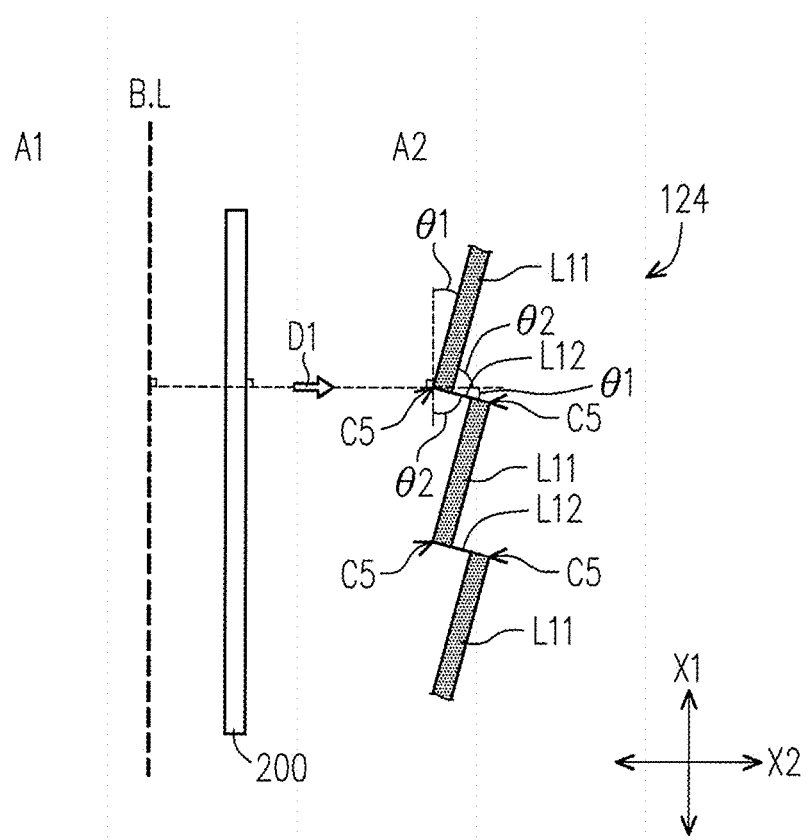

FIG. 10 is an enlarged diagram of the conductive lines according to another embodiment of the disclosure. Referring to FIG. 10, a conductive line 124 may be composed of a plurality of straight-line sections L11, L12 having different widths, and bendings C5 connected between the straight-line sections L11, L12, wherein the angles θ1 and θ2 may refer to the angles depicted in FIG. 6 to FIG. 9. The bendings C5 may form at least one closed angle and/or at least one fillet. The arrangement of the straight-line sections L11, L12 in the present embodiment is in an interlaced manner along the axis X1, and the width of the straight-line sections L11 is large than that of the straight-line sections L12.

As may be seen from the aforementioned description of the embodiments shown in FIG. 6 to FIG. 10, the disclosure shows that the angle θ1 may be, but not limited to 15° to 75° and the angle θ2 may be, but not limited to 75° to 15°. According to the aforementioned embodiments of the disclosure, the lengths or the widths of the straight-line sections may be different such that a resistance of each conductive line may be adjusted properly by changing the lengths or the widths thereof. Take an exemplar, the conductive line may be 1 mm in length and 30 μm in width, and the angle θ1 may be 15°.

Figure 11:
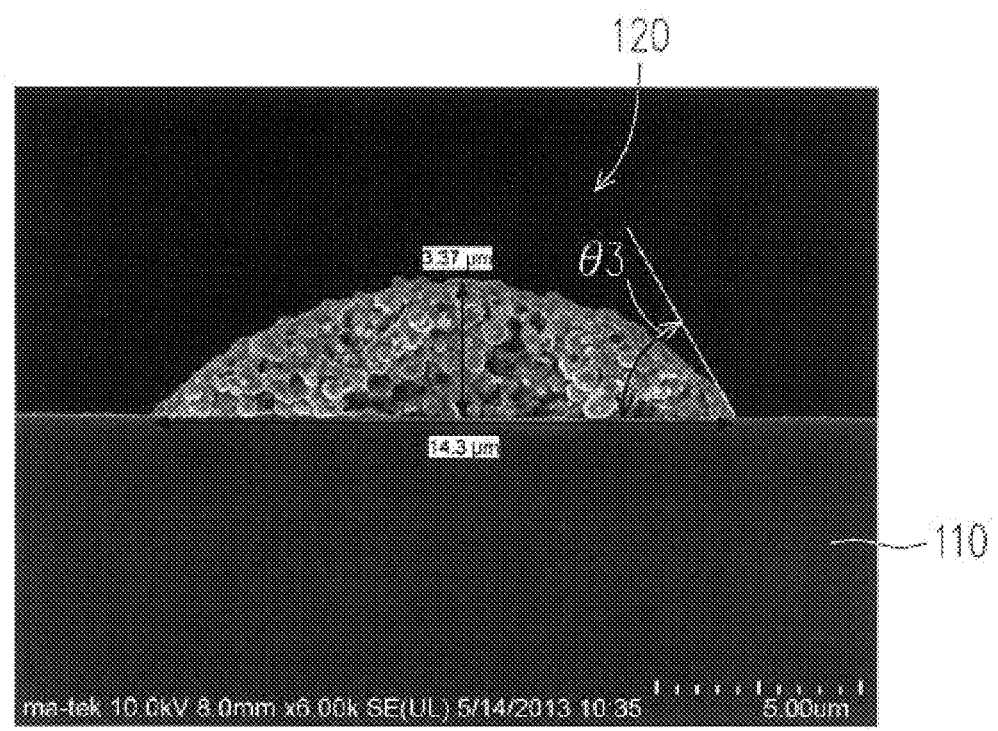
FIG. 11 is a SEM image illustrating conductive lines in a cross-sectional view according to another embodiment of the disclosure.

FIG. 11 is a SEM image illustrating conductive lines in a cross-sectional view, according to another embodiment of the disclosure. Referring to FIG. 11, the conductive line 120 may be printed on the substrate 110 by such as a gravure printing. The structure of the conductive line 120 in the cross-sectional view shows a top profile in an arc or a portion of a circle, and has a more gentle surface relative to the substrate 110. In other words, in an embodiment of the disclosure, there exists an angle θ3 between the edge contour of the conductive line 120 and the substrate 110, and the angle θ3 is substantially an acute angle. While, for a cross-section of the conductive line formed by a photolithography process, an included angle between a lateral surface and a bottom surface of the cross-section is a right angle or exhibits an obtuse angle due to over etching and undercut, which is different from the aforementioned features of the embodiments of the present disclosure.

In an embodiment of the disclosure, the conductive lines 120 at the active area A1 or the frame wire area A2 are formed by the printing process. In a cross section of the conductive lines 120, a junction between a top surface and a lateral surface is a lead angle, or the top surface has a curvature, such that the included angle θ3 between the lateral surface and a bottom surface is an acute angle. Furthermore, in the printing process, under the same printing parameters (such as printing speed, conductive material properties, curing temperature . . . etc.), a width of a conductive line 120 and a thickness of the conductive line 120 are positively correlated. That is, the conductive line 120 is thicker when the conductive line 120 is wider. The conductive lines 120 at each different area (e.g., either active area A1 or frame wire area A2), the width and the thickness of the conductive line 120 are positively correlated too.

According to one embodiment of the disclosure, each of the conductive lines 120 has a surface average roughness that may be ranged from 10% to 50%. For instance, when the thickness of the conductive line is 1 μm, the surface average roughness is 0.1 μm to 0.5 μm.

In an embodiment of the disclosure, a plurality of conductive lines of a sensing device are formed on the substrate by a printing technology. One portion of the conductive lines may form the active area and another portion may form the frame wire area of the sensing device. The frame wire area A2 and the active area A1 are separated by at least one virtual borderline B.L, and the borderline B.L may be, but not limited to a straight line. Furthermore, each of the conductive lines may be formed by a plurality of straight-line sections and at least one bending, and at least one of the plurality of straight-line sections may be inclined relative to a borderline B.L. When the doctor blade extends along a direction (the direction may be perpendicular or parallel to the borderline) to print the conductive material to form the conductive lines on the substrate, the at least one straight-line sections of the conductive lines may be inclined relative to the borderline. This may reduce the residual conductive material during the printing process (i.e. avoiding the residual conductive material existing between adjacent conductive lines and resulting from the short circuit problem). So that, the doctor blade may move smoothly and efficiently perform the printing process.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A conductive line structure, comprising:
    a substrate having a first area, a second area, and at least one borderline separating the first area and the second area, wherein the first area and the second area do not overlap with each other; and
    a plurality of conductive lines disposed at the first area and the second area of the substrate,
    wherein the at least one borderline is a straight line, the plurality of conductive lines disposed at the first area form a mesh structure, the plurality of conductive lines disposed at the second area are a plurality of bending lines deviated at an angle with respect to the at least one borderline, and each of the plurality of bending lines has multiple bendings.

2. The conductive line structure as claimed in claim 1, wherein at the second area, the plurality of bending lines extending along a first axis, the first axis is parallel to the at least one borderline, each of the plurality of bending lines has at least one bending and at least two straight-line sections, and at least one of the at least two straight-line sections is inclined relative to the at least one borderline.

3. The conductive line structure as claimed in claim 1, wherein the plurality of bending lines are parallel to each other.

4. The conductive line structure as claimed in claim 1, wherein a border area of the mesh structure is connected to an adjacent bending line of the plurality of bending lines.

5. The conductive line structure as claimed in claim 4, wherein the border area of the mesh structure is connected to at least one bending, at least one straight-line section, or at least one bending and at least one straight-line section of the adjacent bending line.

6. The conductive line structure as claimed in claim 4, wherein at least one intersection is located at the border area of the mesh structure and connects to at least one bending, at least one straight-line section, or the at least one bending and the at least one straight-line section of the adjacent bending line.

7. The conductive line structure as claimed in claim 2, wherein one straight-line section of two adjacent straight-line sections having a same bending line and the first axis forms a first angle, the other straight-line section of the two adjacent straight-line sections and a second axis forms a second angle, the first angle is ranged from 15° to 75°, the second angle is ranged from 75° to 15°, the second axis is a direction of the conductive lines to be printed, and the first axis is orthogonal to the second axis.

8. The conductive line structure as claimed in claim 2, wherein the at least one bending forms a fillet or a closed angle.

9. The conductive line structure as claimed in claim 2, wherein the at least two straight-line sections have a same length or have different lengths.

10. The conductive line structure as claimed in claim 2, wherein the at least two straight-line sections have a same width or have different widths.

11. The conductive line structure as claimed in claim 1, wherein a width of each of the plurality of conductive lines disposed at the second area is smaller than or equal to 50 μm.

12. The conductive line structure as claimed in claim 1, wherein in a cross-sectional view of the conductive line structure, there exists an angle between the substrate and an edge contour of the plurality of conductive lines disposed at the second area, and the angle is substantially an acute angle.

13. The conductive line structure as claimed in claim 1, wherein each of the plurality of conductive lines has a surface average roughness ranged from 10% to 50%.

14. A sensing device, comprising:
a substrate;
a plurality of conductive lines disposed on the substrate, wherein a portion of the plurality of conductive lines form an active area, and another portion of the plurality of conductive lines form a frame wire area, the active area and the frame wire area do not overlap with each other, and the active area and the frame wire area are separated by at least one borderline,
wherein the at least one borderline is a straight line, the portion of the plurality of conductive lines at the active area form a mesh structure, and said another of the plurality of the conductive lines at the frame wire area are a plurality of bending lines deviated at an angle with respect to the at least one borderline, and each of the plurality of bending lines has multiple bendings.

15. The sensing device as claimed in claim 14, wherein at the frame wire area, the plurality of bending lines extending along a first axis, the first axis is parallel to the at least one borderline, each of the plurality of bending lines has at least one bending and at least two straight-line sections, and at least one of the at least two straight-line sections is inclined relative to the borderline.

16. The sensing device as claimed in claim 14, wherein the plurality of bending lines are parallel to each other.

17. The sensing device as claimed in claim 14, wherein an border area of the mesh structure is connected to an adjacent bending line of the plurality of bending lines.

18. The sensing device as claimed in claim 17, wherein the border area of the mesh structure is connected to at least one bending, at least one straight-line section, or the at least one bending and the at least one straight-line section of the adjacent bending line.

19. The sensing device as claimed in claim 17, wherein at least one intersection is located at the border area of the mesh structure and connected to at least one bending, at least one straight-line section, or the at least one bending and the at least one straight-line section of the adjacent bending line.

20. The sensing device as claimed in claim 15, one straight-line section of two adjacent straight-line sections having a same bending line and the first axis form a first angle, the other straight-line section of the two adjacent straight-line sections and a second axis form a second angle, the first angle is ranged from 15° to 75°, the second angle is ranged from 75° to 15°, the second axis is a direction of said another portion of the plurality of conductive lines to be printed, and the first axis is orthogonal to the second axis.

21. The sensing device as claimed in claim 15, wherein the at least one bending forms a fillet or a closed angle.

22. The sensing device as claimed in claim 15, wherein the at least two straight-line sections have a same length or have different lengths.

23. The sensing device as claimed in claim 15, wherein the at least two straight-line sections have a same width or have different widths.

24. The sensing device as claimed in claim 14, wherein a width of each of said another portion of the plurality of conductive lines at the frame wire area is smaller than or equal to 50 μm.

25. The sensing device as claimed in claim 14, wherein in a cross-sectional view of the sensing device, there exists an angle between the substrate and an edge contour of said another portion of the plurality of conductive lines, and the angle is substantially an acute angle.

26. The sensing device as claimed in claim 14, wherein each of the plurality of conductive lines has a surface average roughness ranged from 10% to 50%.

* * * * *